United States Patent
King, Jr. et al.

(10) Patent No.: US 8,371,622 B2
(45) Date of Patent: Feb. 12, 2013

(54) LEAK PROOF PIPE CONNECTIONS AND LEAK PROOFING PIPE CONNECTIONS

(75) Inventors: Lloyd Herbert King, Jr., Chesterfield, MO (US); David Kreutz, Saint Louis, MO (US); Mathew Walters, Kirkwood, MO (US); Steven Rhea, St. Peters, MO (US); James C. Keeven, O'Fallon, MO (US)

(73) Assignee: The Patent Store LLC, O'Fallon, MO (US)

( * ) Notice: Subject to any disclaimer, the term of this patent is extended or adjusted under 35 U.S.C. 154(b) by 1185 days.

(21) Appl. No.: 12/228,962

(22) Filed: Aug. 18, 2008

(65) Prior Publication Data
US 2009/0051126 A1 Feb. 26, 2009

Related U.S. Application Data

(60) Provisional application No. 60/965,612, filed on Aug. 21, 2007.

(51) Int. Cl.
*F16L 19/00* (2006.01)
(52) U.S. Cl. .......... 285/347; 285/915; 285/3; 285/294.1
(58) Field of Classification Search .................. 285/347, 285/915, 3, 294.4, 294.3, 294.1
See application file for complete search history.

(56) References Cited

U.S. PATENT DOCUMENTS

| | | | | |
|---|---|---|---|---|
| 3,784,235 | A | | 1/1974 | Kessler et al. ................. 285/21 |
| 4,035,002 | A | * | 7/1977 | Curtin ........................... 285/915 |
| 4,103,943 | A | * | 8/1978 | Curtin ........................... 285/915 |
| 4,281,856 | A | * | 8/1981 | Litman et al. ................. 285/915 |
| 4,429,907 | A | * | 2/1984 | Timmons ...................... 285/915 |
| 4,521,037 | A | * | 6/1985 | Knox ............................. 285/915 |
| 4,600,222 | A | * | 7/1986 | Appling ........................ 285/915 |
| 4,804,210 | A | * | 2/1989 | Hancock ....................... 285/915 |
| 5,358,283 | A | * | 10/1994 | Silva ............................. 285/915 |
| 5,449,207 | A | * | 9/1995 | Hockett ........................ 285/915 |
| 5,823,581 | A | * | 10/1998 | Coppolo ....................... 285/915 |
| 5,971,443 | A | | 10/1999 | Noel et al. ...................... 285/94 |
| 6,022,054 | A | * | 2/2000 | Hemphill et al. ............. 285/915 |
| 6,318,761 | B1 | * | 11/2001 | Robertson .................... 285/915 |
| 6,494,501 | B2 | * | 12/2002 | Gotoh ............................ 285/915 |
| 7,350,828 | B2 | * | 4/2008 | Williams ........................... 285/3 |
| 7,971,909 | B2 | * | 7/2011 | Nakata et al. .................... 285/3 |

FOREIGN PATENT DOCUMENTS

| | | |
|---|---|---|
| KR | 2019980033024 U | 9/1998 |
| KR | 1020030087579 | 11/2003 |
| WO | WO99/34142 | 7/1999 |
| WO | WO2005/043021 | 5/2005 |

* cited by examiner

*Primary Examiner* — David E Bochna
(74) *Attorney, Agent, or Firm* — Jacobson & Johnson LLC

(57) ABSTRACT

A sealing ring and a method of preventing or stopping a joint leak between a pipe and a pipe fitting to minimize property damage as well as clean up costs occurring from property damage due to joint leaks by securing a sealing ring to the pipe and the pipe fitting to form a secondary joint that inhibits or prevent leakage between the primary joint between the pipe and the pipe fitting.

5 Claims, 2 Drawing Sheets

LEAK PROOF PIPE CONNECTIONS AND LEAK PROOFING PIPE CONNECTIONS

CROSS REFERENCE TO RELATED APPLICATIONS

This application claims priority to provisional patent application Ser. No. 60/965,612 filed Aug. 21, 2007 titled LEAKPROOF PIPE CONNECTIONS AND LEAKPROOFING PIPE CONNECTIONS.

FIELD OF THE INVENTION

This invention relates generally to leak proofing pipe connections and, more specifically, to leak proofing joints between pipes and fittings such as PVC pipes and fittings.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of a method of solvent welding is well known in the art. In solvent welding a thermoplastic polymer fitting, such as PVC, is coated with a thin layer of solvent that for a short time dissolves the surfaces of the polymer fitting creating a viscous liquid film on the surface of the fitting. While the surface of the polymer fitting is in the dissolved or liquid state it is joined to a surface of a polymer pipe that also has a thin layer of solvent thereon which also creates a viscous liquid film on the surface of the pipe. While both the surfaces of the polymer fittings have a thin viscous film the fittings are brought together and held in position. As the viscous film solidifies or cures it creates a solvent welded joint between the two fittings. If for some reason the film does not cover the entire shared surfaces between the pipe and the fitting a leak can occur causing property damage as well as clean up costs and time.

SUMMARY OF THE INVENTION

The invention comprises a sealing ring and a method of preventing or stopping joint leaks between pipes and fittings to minimize property damage as well as clean up costs occurring from property damage due to joint leaks. In one mode of the invention a sealing ring may be placed around the exterior cylindrical surface of a pipe prior to securing the pipe to a fitting. The sealing ring may then be secured to the pipe and the fitting at the time the pipe is secured to the fitting to prevent joint leaks between the pipe and the fitting. In another mode of the invention, the sealing ring may be secured around the exterior cylindrical surface of a pipe and secured to the pipe and the fitting after discovering a joint leak between the pipe and the pipe fitting to thereby stop the joint leak and thus prevent further joint leakage.

DESCRIPTION OF THE PREFERRED EMBODIMENT

In one mode the invention provides a leak proofing system for preventing or stopping joint leaks through a safety or sealing ring and a securement film, which may be a solvent welding film, so that the sealing ring may be solvent welded to both a pipe and a fitting. While the system is described with regard to using a securement film, which can be cured such as a solvent welding film, the leak proofing system is also well suited for fittings that are secured to each other other than by solvent welding films, for example adhesives or the like. In another mode the invention includes a method of leak proofing by securing a pipe to a fitting through a first surface-to-surface joint that may or may not be leak proof and placing a sealing ring around an exterior cylindrical surface of the pipe and then securing the sealing ring to the pipe and the fitting to form a further surface-to-surface joint with the further surface-to-surface joint located proximate to the first surface-to-surface joint and in series therewith to thereby inhibit a leak through the first surface-to-surface joint.

Figure 1:
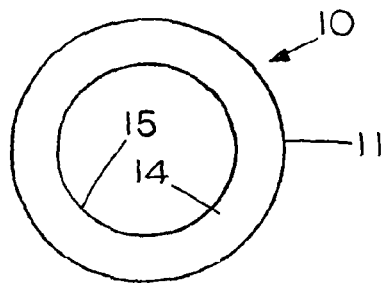
FIG. 1 is a front view of a one-piece closed sealing ring for leak proofing joints between members.

FIG. 1 shows a front view of an example of a one-piece leak proofing member such as a thermoplastic member comprising a PVC sealing ring or closed safety ring 10 for leak proofing a circumferential joint between thermoplastic members such as a PVC pipe and a PVC fitting. Sealing ring 10 includes an outer annular surface 11 and an pipe engagement surface 15 and an annular end face 14 for engaging the exterior surface of a pipe fitting. That is, annular surface 15 and annular surface 14 are at a right angle or at substantial right angles to each other to permit annular surface 14 to abut against the end of a pipe fitting and to permit annular pipe engaging surface 15 to engage an exterior surface of a pipe 31. The annular surfaces are shown at a right angle to each other so they can be mated with pipe surfaces and fittings that are also at right angles to each other. In some applications, the surfaces of the sealing ring may be at angles other than right angles as long as the sealing ring 10 can be seated to a pipe and a fitting where a leak may occur. In the example shown the annular surface 15 has a diameter sufficiently large so as to slide along an exterior pipe surface but sufficiently small so that a diametrical clearance between the exterior pipe surface and the annular surface 15 permits joining an exterior pipe surface and the annular surface to each other with a securement film present therebetween.

Figure 2:
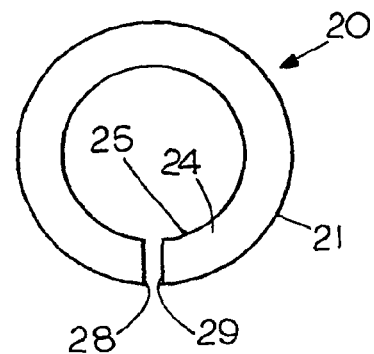
FIG. 2 is a front view of a one-piece, split sealing ring for leak proofing joints between thermoplastic members.

FIG. 2 is a front view of another example of a sealing ring comprising a one-piece split sealing ring 20 for leak proofing joints between members that have been previously joined together. Split-sealing ring 20 includes an outer annular surface 21, an annular pipe engaging face 25 and an annular end face 24 that is perpendicular to annular surface 25. In the example shown annular end face 24 can abut against the end of a pipe fitting and an annular surface 25 can engage the exterior surface of a pipe. In some applications, the surfaces of the sealing ring 20 also may be at angles other than right angles as long as the sealing ring 20 can be seated to a pipe and a fitting where a leak may occur.

The split-sealing ring 20 allows one to place the sealing ring around a pipe without having to slide the sealing ring over the end of the pipe. That is, the split-sealing ring 20 retains sufficient flexibility so that the end 28 and the end 29 can be separated or spread apart to allow lateral insertion of the split-sealing ring 20 around a pipe with the ring having sufficient resiliency to return to its original shape after the sealing ring is placed around the pipe. Thus, with the sealing ring 20 a user can laterally place the sealing ring around a pipe and seal a leak in a system without having to cut, remove and replace an existing leaking fitting and pipe since the split ring can be positioned next to a leaky fitting and secured to the pipe and the leaky fitting to thereby provide a secondary seal to inhibit or prevent leakage from a primary joint between the pipe and the fitting.

Figure 3:
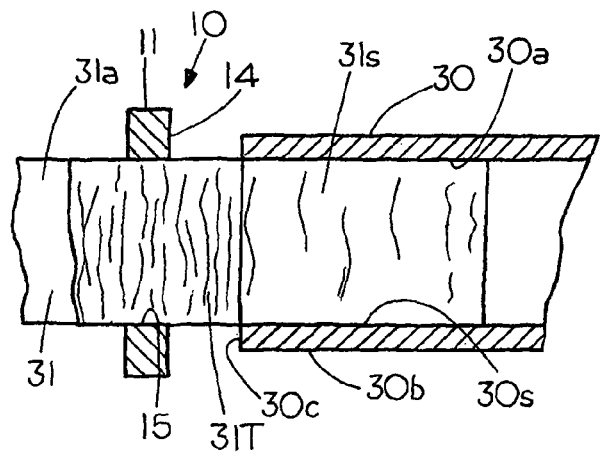
FIG. 3 is a sectional view of a thermoplastic pipe secured to a thermoplastic coupling with a sealing ring in an unsealed condition.
Figure 4:
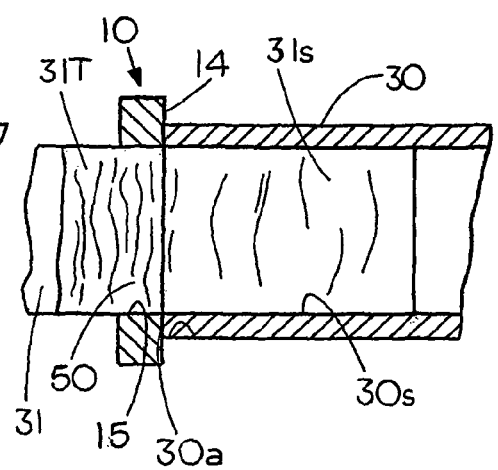
FIG. 4 is a sectional view of a thermoplastic pipe secured to a thermoplastic coupling with a sealing ring in a sealed condition.

FIG. 3 shows sealing ring 10 positioned around a pipe 31 and proximate a fitting 30 in an unsealed condition and FIG. 4 shows the sealing ring 10 having annular surface 14 of the sealing ring 10 abutting against the fitting 30 in a sealed condition to provide a leak proof seal/connection between fitting 30 and pipe 31. More specifically, FIG. 3 is a sectional view of a pipe coupling 30 and sealing ring 10, which is located on the exterior surface 31a of pipe 31, with sealing ring 10 in an unsealed condition and pipe 31 and pipe coupling 30 in a sealed condition. FIG. 3 shows a solvent film 31s, which can be applied by a brush or dauber, located on a portion of the exterior surface 31a of pipe 31. The cured solvent film 31s, which is located on the interior of fitting 30, that secures pipe 31 to fitting 30. A second solvent film 31t, which can also be applied by a brush or dauber, is located on the portion of the exterior surface 31a of pipe 31 that extends outward from fitting 30. If the solvent welding of the annular outer surface 31a of pipe 31 to annular inner surface 30s of fitting 30 do not provide a leak proof seal between the pipe 31 and fitting 30, one can leak proof the connection therebetween with sealing ring 10 by securing the sealing ring 10 to the pipe 31 and fitting 30 so that when the solvent films 31t cures, it form a secondary seal or welded joint between pipe 31, sealing ring 10 and fitting 30.

To appreciate the system of leak proofing a connection between pipe 31 and coupling 30 reference should be made to FIG. 3 and FIG. 4. FIG. 3 shows the sealing ring 10 prior to the sealing ring 10 being brought into a sealing condition and FIG. 4 shows the sealing ring 10 in a sealing condition with the sealing ring 10 positioned around the exterior of pipe 31 and secured to the pipe 31 and to the end of fitting 30 through solvent welding. Once cured, as illustrated in FIG. 4, the sealing ring 10 inhibits or prevents leakage in the primary joint between the pipe 31 and fitting 30 by providing a secondary joint between sealing ring 10 coupling 30 and pipe 31 which is in series with the primary joint.

In the example shown in FIG. 3, pipe 31 is secured to a fitting comprising a coupling 30 through a cured solvent film 31s. In order to prevent or stop a joint leak between pipe 31 and fitting 30 the sealing ring 10 can be secured to both pipe 31 and fitting 30. In leakproofing a joint between pipe 31 and fitting 30 one can apply a conventional securement film such as a solvent film 31t to the exterior surface 31a of pipe 31, which is located between sealing ring 10 and the end of fitting 30, annular surface 15, annular end face 14 of sealing ring 10 and to end face 30c of fitting 30. Typically, the solvent film 31t may extend at least partially over any exposed solvent film 31s which was used to secure pipe 31 to fitting 30 if the solvent 31s has dried on pipe 31.

While the solvent 31t is still in the viscous or flowable state the sealing ring 10, which is in the presence of solvent sealant 31t, is slid axially along pipe 31 and into engagement with the end of coupling 30 as illustrated in FIG. 4. The sealing ring 10 and coupling 30 are held in place until the film of solvent 31t solidifies thereby forming a second solvent weld, which secures the sealing ring 10 to both the pipe 31 and the end of the coupling 30. It is noted that in the example of FIG. 3 the second solvent welded joint between the sealing ring 10, pipe 31 and pipe coupling 30 forms a secondary joint, which is a barrier for fluid to escape threrethrough. Consequently, if a leak exists in a primary solvent welded joint between coupling 30 and pipe 31, the second welded joint between the sealing ring 10 and the pipe 31 and coupling 30 prevents or inhibits leakage therepast. Even if the secondary joint should have a leak the odds of an alignment of a leak in the primary joint and the secondary joint are small so that the chances of a pipe leak occurring have been greatly diminished. While the preferred method is to allow the primary joint to cure before forming the secondary joint in some instances, one may want to secure both the primary and secondary joints at the same time.

In the preferred method of providing a secondary seal, the primary solvent welded joint is allowed to set or cure before the secondary solvent welded joint is formed. It should be pointed out that while the invention is described in regard to solvent welding other methods used to secure pipes to fittings or the like using adhesives, such as glue, can also be used to leak proof a joint through the use of sealing ring and an adhesive. In addition, the leak proofing can also be used with systems wherein the primary joint is formed by other methods such as sonic welding or the like and the secondary joint is formed through other methods including sonic welding, adhesives, solvents and the like.

Thus in one example the invention includes a method of leak proofing thermoplastic members such as pipe 31 and pipe coupling 30 by securing the thermoplastic pipe 31 to a thermoplastic fitting 30 through solvent welding to thereby form a first solvent secured joint therebetween that may or may not be leak proof. One can then place a sealing ring around an exterior cylindrical surface of the thermoplastic pipe 31 and apply a film of solvent to the exterior surface of the thermoplastic pipe and to an annular cylindrical surface and a cylindrical end face of a sealing ring. One can then bring the sealing ring 10 into engagement with the fitting 30 before the solvent has set. By holding the sealing ring 10 and the fitting 30 in position until the solvent sets or cures a further solvent secured joint is formed with the further solvent secured joint located in series with the first solvent secured joint.

Figure 5:
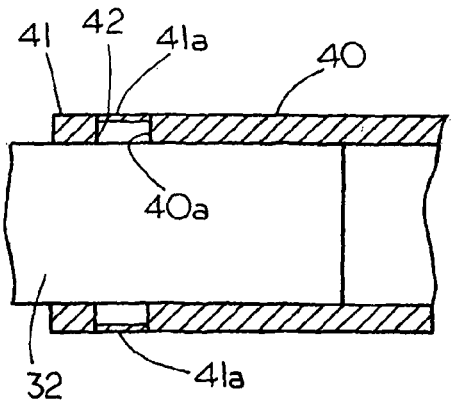
FIG. 5 is an alternate example of a sealing ring in an unsealed condition but secured to coupling by a runner.
Figure 6:
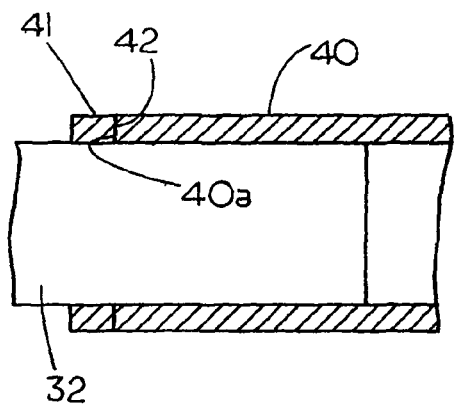
FIG. 6 shows the sealing ring of FIG. 5 secured to a thermoplastic pipe and a thermoplastic coupling to provide a leak proof seal between the thermoplastic pipe and the thermoplastic coupling.

FIG. 5 is yet another example of a sealing ring 41 in an unsealed condition, which is secured to coupling 40 by a ruptureable longitudinal extending runner or web 41a. In this example the pipe 32 the coupling 40 are located around pipe 32 and sealing ring 41 is not secured to pipe 32 but coupling 40 is secured to pipe 32. However, if a leak is discovered between coupling 40 and pipe 32 or if one wants to ensure that no leaks occur therebetween, the ruptureable runner 41a can be broken and a securement film positioned on pipe 32 so that the sealing ring 41 can be axially slid to the end of the fitting 40 as shown in FIG. 6. While the fitting 40 is shown with a sealing ring 41 having an annular surface 42 that extends radially outward and can abut surface 40a the annular surface 42 can be partly or wholly angled so that when the sealing ring 41 is brought proximate the end of the fitting 40 the solvent is forced into the junction between the pipe 32 and the fitting 40 to thereby form a bead of securement film around the exterior of the pipe 40.

FIG. 6 shows the sealing ring of FIG. 5 secured to both a pipe 32 and a coupling 40 to provide a secondary leak proof seal between the pipe 32 and the coupling 40. In this example the runner or web 41a, which holds the sealing ring proximate the coupling is ruptured or removed and the sealing ring 41 is then secured to the end of the fitting 40 and to the pipe 32 Thus, when the sealing ring 41 and the coupling 40 are in an end-to-end condition with the sealing ring secured to the pipe 32 one leak proofs the primary joint between pipe 32 and coupling 40.

Figure 7:
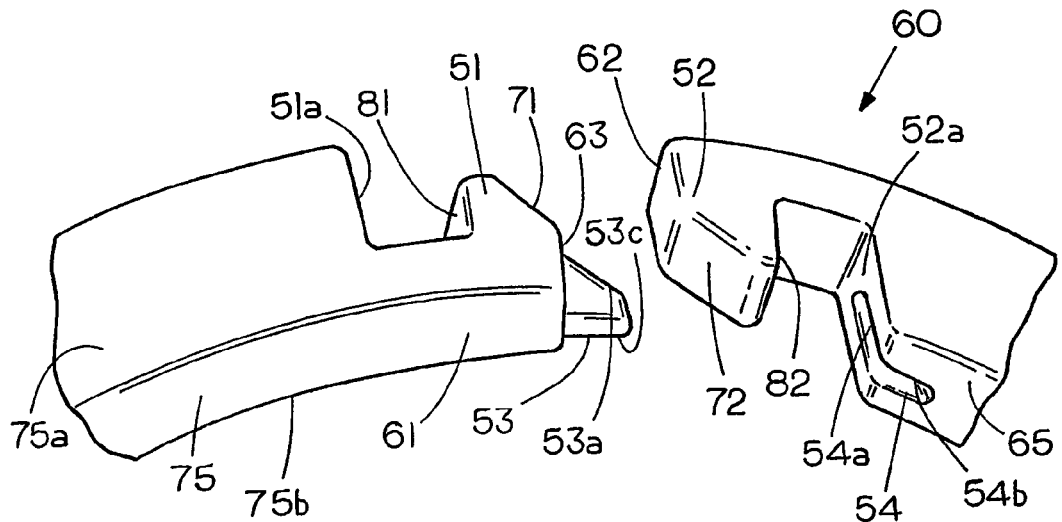
FIG. 7 is an example of connectable ends on a one-piece, split-sealing ring.
Figure 8:
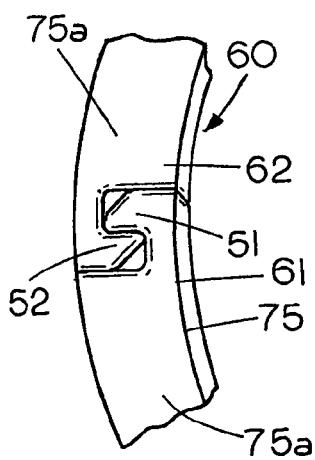
FIG. 8 is a partial side view of the connectable ends of FIG. 7 in an engaged condition.
Figure 9:
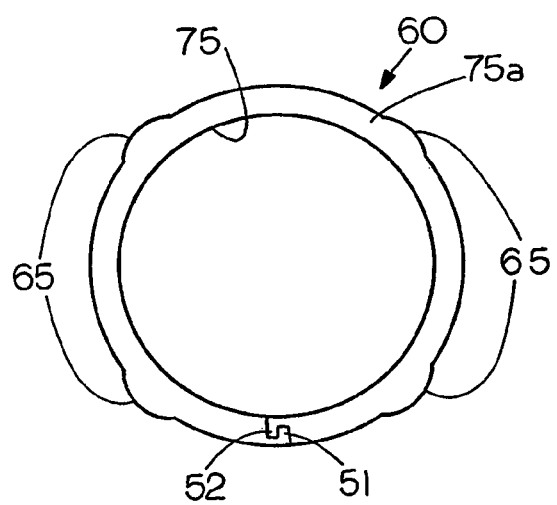
FIG. 9 is a front view of the sealing ring with the connectable ends of FIG. 8.

FIG. 7-FIG. 9 show yet another example of a split sealing ring 60 having connectable ends 62 and 61. The connectable ends 62 and 61 allow one to form sealing ring 60 into a closed ring for securing around a pipe. FIG. 7 shows the connectable ends 61 and 62 in an unengaged condition and FIG. 8 and FIG. 9 shows the connectable ends 61 and 62 in the connected condition for securing to a pipe and coupling to provide a leak proof seal between the pipe and coupling. Split-sealing ring 60 includes a hook 51 and a hook 52, which are shown in FIG. 7 as identical, however they need not be. Specifically, hook 51 and hook 52 are located on connectable ends 61 and 62, respectively. Hook 51 has an angled or canted face 81 and similarly hook 52 has an angled or canted face 82. Angled faces 81 and 82 prevent the hooks from slipping apart or separating since a circumferential force will draw the hooks toward each other. That is, when the hooks are matingly engaged, face 81 of hook 51 and face 82 of hook 52 engage each other to prevents or inhibit separation of the connectable ends 61 and 62 of sealing ring 60. Although canted faces are shown other methods and means of maintaining the connectable ends in engagement with each other may be used.

Split-sealing ring 60 also includes a tab 53 and a groove 54 for laterally securing the connectable ends 61 and 62 of split-sealing ring 60. In the example shown both tab 53 and groove 54 are integral to split-sealing ring 60. As one engages hooks 51 and 52 with each other, tab 53 and groove 54 engage with each other to prevent lateral movement of the connectable ends of the sealing ring 60 with respect to each other. More specifically, tab 53 with sidewall 53a and 53c matingly engage with groove sidewall 54b and groove sidewall 54a. It is noted that the width of side wall 54a and the width of groove wall 54b are sufficiently sized to allow tab 53 to be inserted into groove 54, preferably without the aid of tools. In the engaged condition, hook face 63 of hook 51 is proximate face 52a of hook 52 and hook face 62 is proximate face 51a of hook 51.

It is noted that the hooks, tab and groove are just examples of mechanically securing the connectable ends of split-sealing ring 60 to prevent both longitudinal and lateral movement of the connectable ends with respect to each other. Furthermore, while FIG. 7 shows sealing ring restraining members comprising a pair of hooks 51 and 52 that engage with each other to prevent longitudinal movement of sealing ring 60 and a tab 53 and groove 54 that engage with each other to prevent lateral movement of sealing ring 60, in some instances only one or the other (for example, a pair of hooks or tab and groove) may be used to secure the sealing ring 60 around a pipe or the like.

FIG. 8 shows the split-sealing ring 60 in an engaged condition with the connectable ends joined to each other. The split-sealing ring 60 like sealing ring 20 shown in FIG. 2, allows one to place the sealing ring 60 around a pipe without having to slide the sealing ring over the end of the pipe. That is, the split-sealing ring 60 retains sufficient flexibility so that the ends 61 and 62 can be separated to allow lateral insertion of the split-sealing ring 60 around a pipe with a leaky fitting or in some cases a pipe that may develop a leak and also has sufficient resiliency to return to its original circular shape after the sealing ring is placed around the pipe. Thus, with the sealing ring 60 a user can seal a leak in a system without having to cut, remove and replace the existing fitting and pipe since the split ring can be positioned next to a leaky fitting and secured to the pipe and the leaky fitting to provide a secondary seal to inhibit or prevent leakage from the primary joint between the pipe and the fitting.

FIG. 9 shows a front view of sealing ring 60 having a hand grip comprising four curved radial hand or finger gripping protrusions 65 that are spaced around the outer circumference of sealing ring 60. While four finger gripping regions are shown more or less may be used. The radial protrusion are finger friendly in that they allow a person to grasp and rotate the ring 60 as one slides the sealing ring into a sealing position. That is to position the sealing ring to prevent or stop a leak, the user may rotate the sealing ring around the pipe (not shown) with one hand while at the same time axially sliding the sealing ring toward a fitting with a leaky joint. The radial protrusions 65 may be smooth or contain axial groves to allow comfortable yet firm engagement of a user's fingers with the sealing ring 60 such that the user may rotate sealing ring 60 into a sealing condition against a pipe fitting. Radial protrusions 65 are also of sufficient height to provide ease of use for the user and also to ensure that the sealing ring with protrusions fits within the space wherein the sealing ring is used. While hand grip is shown with radial protrusions the hand grip may also be formed with relief regions in the sealing ring 60.

While FIGS. 1-9 show a one-piece or split sealing ring, if desired the sealing ring could be comprised of more than one piece. For example, the use of two sets of connectable ends on a sealing ring would allow one to place one portion of a sealing ring around a pipe and then secure the other portion of the sealing ring to the one portion of the sealing ring.

Thus, in one embodiment the invention comprises a combination, namely a sealing ring having an annular sealing surface, a pipe and a pipe fitting having a joint therebetween that may or may not leak; and a securement film present on either the annular sealing surface or the pipe or both, with the sealing ring positionable along the pipe and into engagement with the pipe fitting when the securement film is in an uncured state. When the securement film is cured the securement film secures the sealing ring proximate the pipe and the pipe fitting to thereby inhibit or prevent leaks through a primary joint between a pipe and a fitting.

We claim:

1. In combination:
   a PVC pipe;
   a cylindrical one-piece PVC split sealing ring having a first end and a second end; an annular end face and an annular pipe engagement surface with the sealing ring having sufficient flexibility so that a first end of the sealing ring and the second end of the sealing ring can be spread apart to allow lateral insertion of the sealing ring around the pipe with the sealing ring having sufficient resiliency to return to its original shape after the sealing ring is placed around the pipe;

a PVC pipe fitting located on the outside of said PVC pipe with said PVC pipe extending into said PVC pipe fitting, and having an annular bonded joint between the pipe and the pipe fitting that may or may not leak; and a securement film present on either the annular pipe engagement surface of the split sealing ring or the external surface of the pipe or both, said sealing ring spaced from an end of the pipe in the pipe fitting with the annular end face of the sealing ring positionable along the pipe and into face to face engagement with an annular edge of the pipe fitting when the securement film is in an uncured state, said securement film securing said sealing ring proximate said pipe and said pipe fitting when the securement film is in a cured state to thereby inhibit or prevent leaks through the joint.

2. The combination of claim 1 wherein the sealing ring includes an annular surface having a diameter sufficiently larger than the diameter of the pipe so as to slide along an exterior pipe surface but sufficiently small so that a diametrical clearance between the exterior pipe surface and the annular surface on the sealing ring permits joining the exterior pipe surface and the annular surface securement film to each other.

3. The combination of claim 1 wherein the annular end face includes a further annular sealing surface located at a right angle to the annular end face.

4. The combination of claim 1 wherein the sealing ring includes an exterior surface having a plurality of radial protrusions to thereby help a user easily grip and rotate the sealing ring.

5. In combination:

a cylindrical one-piece, sealing ring having an annular end sealing surface and an annular pipe engagement surface;

a thermoplastic pipe and a thermoplastic pipe fitting having an annular bonded joint therebetween that may or may not leak; and a securement film present on either the annular pipe engagement surface or the external surface of the pipe or both, said sealing ring annular end sealing surface positionable along the pipe and into engagement with an annular edge of the pipe fitting when the securement film is in an uncured state, said securement film securing said sealing ring proximate said pipe and said pipe fitting when the securement film is in a cured state to thereby inhibit or prevent leaks through the joint wherein the sealing ring is secured to the pipe fitting through a ruptureable member.

* * * * *